Patented Mar. 13, 1951

2,544,903

UNITED STATES PATENT OFFICE 2,544,903

PHOTOSENSITIVE COATING CONTAINING DYES

Henry C. Staehle, Rochester, N. Y., assignor to Eastman Kodak Company, Rochester, N. Y., a corporation of New Jersey No Drawing. Application May 3, 1947, Serial No. 745,736

3 Claims. (Cl. 95—5.6)

This invention relates to the preparation of sensitive photographic materials and particularly to sensitive materials containing dyes for the formation of colored images.

In my U. S. application, Serial No. 558,346, filed October 12, 1944, I have described the preparation of photographic reversal images in a coating of bichromated hydrophilic colloid such as gelatin or glue, containing an aqueous dispersion of a water-insoluble, soft synthetic resin capable of drying to a continuous film when the dispersion is coated on glass. I prefer to use as the soft, synthetic resin an aqueous dispersion of an acrylate resin such as polymethylacrylate or polyethylacrylate, a polystyrene dispersion, a polyvinyl acetate dispersion or neoprene latex. A dispersion of plasticized cellulose nitrate in water may also be employed. The mixture may also contain a wetting or dispersing agent such as a sodium alkyl sulfate or a polyethylene glycol and a plasticizing agent such as glycerol or ethylene glycol. In my prior application, Serial No. 558,346, I disclosed the incorporation of white pigments such as titanium oxide or colored pigments such as carbon black, cobalt blue or yellow ochre in the mixture. While titanium oxide may be incorporated in the sensitive material to form a satisfactory coating, the replacement of titanium oxide with colored pigments or dyes does not ordinarily result in a satisfactory product. Many of the commonly used inorganic pigments react with the ammonium bichromate and destroy the sensitivity of the material.

It is an object of the present invention to provide a novel method for producing colored images in a bichromated hydrophilic colloid containing an aqueous dispersion of a soft, synthetic resin. A further object is to provide colored images which are transparent to light. Other objects will appear from the following description of my invention.

These objects are accomplished by incorporating in the sensitive material made according to the process of my prior application, Ser. No. 558,346, in place of the titanium oxide or other pigment, any water-insoluble dye which is commonly used for dyeing cellulose acetate fabrics. Azo dyes having the following formula are frequently used as cellulose acetate dyes and are suitable for use according to my invention:

$$R-N=N-R'-X$$

where R is an aryl nucleus of the benzene series, R' is an arylene nucleus of the benzene series, X is hydroxyl, amino or substituted amino such as dihydroxydialkylamino or R'X may be a pyrazolone nucleus attached in the 4-position to the azo group. Anthraquinone dyes may also be used.

Dyes which may be used according to my invention are described in Reddelien and Matzdorf U. S. Patent 1,673,301, June 12, 1928, Ellis and Croft U. S. Patent 1,600,277, September 21, 1926, and Olpin U. S. Patent 1,688,553, October 23, 1928. These dyes are water-insoluble.

According to my invention a colloidal dispersion of a water-insoluble but resin-soluble dye is incorporated in a bichromated hydrophilic colloid mixture containing a dispersion of a water-insoluble, soft, synthetic resin. The tinctorial power of the suspension is comparatively low so that the presence of the dye, even though it is strongly blue-absorbing has comparatively little actinic light absorption in its colloidal state. After exposing and processing the sensitive layer, the full color of the dye is brought out by exposing the image to a solvent for the dye in the vapor phase.

My invention will be further illustrated by reference to the following example.

Seven grams of 4-nitrobenzeneazo-2'-methyl-4'-di-β-hydroxyethylaniline (cake) are dissolved in 75 cc. of warm acetone. This solution is added to 175 cc. of 15% gelatin solution to which 5 cc. of a sodium alkyl sulfate dispersing agent has been added. To produce a smooth dispersion of the dye in the gelatin solution, the mixture may be run through a colloid mill.

A sensitive mixture is prepared by mixing 30 cc. of a 15% gelatin solution with 18 cc. of polymethyl acrylate of polyethyl acrylate resin dispersion in water. To this mixture is added 20 cc. of the dye gelatin mixture. To this there is added 1½ cc. of 20% ammonium bichromate solution and 5 drops of ammonium hydroxide. The sensitive mixture is then applied by brushing or spraying on a surface such as metal, lacquered surfaces, plastics such as white polyvinyl acetate, etc., and exposed under an image. The layer is processed by washing with water, the exposed portions washing away leaving those portions of the image which were not exposed to light.

Although the final image is strongly colored, the full brilliance and purity of the dye must be brought out by a subsequent treatment. One method of accomplishing this is to spray a lacquer, the solvent of which is a solvent for the dye, over the image. This, however, causes a slight bleeding of the dye with consequent destruction of minute detail. Another method which is preferable is to subject the final image to the vapor of a solvent of the dye such as acetone vapor. This immediately brings the dye to its full brilliance without any perceptible bleeding of the dye, unless there is a condensation of liquid acetone on the image surface. The image can also be immersed in an emulsion of chloroform and water to increase the brilliance.

Multi-colored images may be prepared by repeating the spraying, exposing and processing cycle with as many different colored materials as desired since the presence of one image does not interfere with the application of a subsequent coating.

I claim:

1. The method of making a colored photographic image which comprises coating a support with a bichromated hydrophilic colloid, an aqueous dispersion of a synthetic resin of the group consisting of polymethyl acrylate and polyethyl acrylate and mixtures thereof and a water-insoluble azo dye of the general formula:

$$R-N=N-R'-X$$

where R is an aryl radical of the benzene series, R' is an arylene radical of the benzene series, X is selected from the class consisting of hydroxyl and amino, drying said coating, exposing said coating to an image, and washing away the exposed parts of said coating to leave said coating containing said azo dye in the unexposed portions.

2. The method of making a colored photographic image which comprises coating a support with bichromated gelatin containing an aqueous dispersion of a synthetic resin of the group consisting of polymethyl acrylate and polyethyl acrylate and mixtures thereof containing 4-nitrobenzene-azo-2'-methyl-4'-di-β-hydroxyethyl aniline, drying said coating, exposing said coating to an image, and washing away the exposed parts of said coating to leave said coating containing said azo dye in the unexposed portions.

3. The method of making a colored photographic image which comprises coating on a support with a bichromated hydrophilic colloid, an aqueous dispersion of at least one synthetic resin of the group consisting of polymethyl acrylate, polyethyl acrylate, styrene, vinyl acetate and neoprene resins, and a water-insoluble azo dye of the general formula:

$$R-N=N-R'-X$$

where R is an aryl radical of the benzene series, R' is an arylene radical of the benzene series, X is selected from the class consisting of hydroxyl and amino, drying said coating, exposing said coating to an image, and washing away the exposed parts of said coating to leave said coating containing said azo dye in the unexposed portions.

HENRY C. STAEHLE.

REFERENCES CITED

The following references are of record in the file of this patent:

UNITED STATES PATENTS

| Number | Name | Date |
|---|---|---|
| 1,981,102 | Hagedorn | Nov. 20, 1934 |
| 2,043,905 | Seymour | June 9, 1936 |
| 2,184,310 | Meigs | Dec. 26, 1939 |